(12) United States Patent
Hsiao et al.

(10) Patent No.: US 7,774,300 B2
(45) Date of Patent: Aug. 10, 2010

(54) SYSTEM AND METHOD FOR DATA MODEL AND CONTENT MIGRATION IN CONTENT MANAGEMENT APPLICATIONS

(75) Inventors: Hui-I Hsiao, Saratoga, CA (US); Joshua Wai-ho Hui, San Jose, CA (US); Madhumati Krishnan, San Jose, CA (US); San-Ju Lin Shi, San Jose, CA (US); Lin Xu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 11/299,085

(22) Filed: Dec. 9, 2005

(65) Prior Publication Data

US 2007/0136353 A1 Jun. 14, 2007

(51) Int. Cl.
*G09F 7/00* (2006.01)
(52) U.S. Cl. ...................................... 707/602
(58) Field of Classification Search ................. 707/602
See application file for complete search history.

(56) References Cited

U.S. PATENT DOCUMENTS

| | | | | |
|---|---|---|---|---|
| 4,558,413 | A * | 12/1985 | Schmidt et al. | 707/203 |
| 6,275,827 | B1 * | 8/2001 | deVries et al. | 707/102 |
| 6,405,211 | B1 * | 6/2002 | Sokol et al. | 707/103 Y |
| 6,598,219 | B1 * | 7/2003 | Lau | 717/108 |
| 6,601,071 | B1 * | 7/2003 | Bowker et al. | 707/102 |
| 6,604,105 | B1 * | 8/2003 | Roth | 707/100 |
| 6,785,685 | B2 | 8/2004 | Soetarman et al. | |
| 7,076,736 | B2 * | 7/2006 | Hugh | 715/743 |
| 7,089,235 | B2 * | 8/2006 | Dettinger et al. | 1/1 |
| 7,092,968 | B1 * | 8/2006 | Ebel et al. | 1/1 |
| 7,165,101 | B2 * | 1/2007 | Daniels et al. | 709/223 |
| 7,203,938 | B2 * | 4/2007 | Ambrose et al. | 717/170 |
| 7,529,784 | B2 * | 5/2009 | Kavuri et al. | 1/1 |
| 7,580,950 | B2 * | 8/2009 | Kavuri et al. | 1/1 |
| 7,627,617 | B2 * | 12/2009 | Kavuri et al. | 1/1 |
| 2001/0032199 | A1 * | 10/2001 | Delo | 707/3 |
| 2002/0007405 | A1 * | 1/2002 | Bahadur | 709/218 |
| 2002/0133516 | A1 * | 9/2002 | Davis et al. | 707/513 |
| 2003/0014424 | A1 * | 1/2003 | Sokol et al. | 707/102 |
| 2003/0105833 | A1 * | 6/2003 | Daniels et al. | 709/219 |
| 2003/0115548 | A1 | 6/2003 | Melgar | |
| 2003/0140308 | A1 * | 7/2003 | Murthy et al. | 715/500 |
| 2003/0204481 | A1 * | 10/2003 | Lau | 707/1 |
| 2004/0194016 | A1 | 9/2004 | Liggitt | |
| 2004/0205562 | A1 | 10/2004 | Rozek et al. | |
| 2004/0216030 | A1 | 10/2004 | Hellman et al. | |
| 2004/0260565 | A1 * | 12/2004 | Zimniewicz et al. | 705/1 |
| 2004/0260715 | A1 | 12/2004 | Mongeon et al. | |
| 2005/0027681 | A1 | 2/2005 | Bernstein et al. | |

(Continued)

*Primary Examiner*—Hung Q Pham
*Assistant Examiner*—Hubert Cheung
(74) *Attorney, Agent, or Firm*—Hovey Williams LLP

(57) ABSTRACT

A system and method for data model and content migration in content management applications is disclosed that facilitates data migration by utilizing a markup-language format to preserve dependency and enable compatibility among various platforms, applications, devices, etc. The method generally includes retrieving a plurality of objects, determining a dependency of the plurality of objects, extracting object definitions from the objects, forming a markup-language user document with the extracted object definitions utilizing the determined object dependency, and exporting the markup-language user document.

15 Claims, 7 Drawing Sheets

U.S. PATENT DOCUMENTS

| | | | |
|---|---|---|---|
| 2005/0131920 A1* | 6/2005 | Rust et al. | 707/100 |
| 2005/0195660 A1* | 9/2005 | Kavuri et al. | 365/189.05 |
| 2005/0226059 A1* | 10/2005 | Kavuri et al. | 365/189.05 |
| 2005/0256825 A1* | 11/2005 | Dettinger et al. | 707/1 |
| 2006/0004781 A1* | 1/2006 | Burgel et al. | 707/100 |
| 2006/0004818 A1* | 1/2006 | Claudatos et al. | 707/101 |
| 2006/0004819 A1* | 1/2006 | Claudatos et al. | 707/101 |
| 2006/0004820 A1* | 1/2006 | Claudatos et al. | 707/101 |
| 2006/0004868 A1* | 1/2006 | Claudatos et al. | 707/104.1 |
| 2006/0294459 A1* | 12/2006 | Davis et al. | 715/513 |
| 2007/0067373 A1* | 3/2007 | Higgins et al. | 707/206 |
| 2007/0103984 A1* | 5/2007 | Kavuri et al. | 365/185.17 |
| 2007/0169010 A1* | 7/2007 | Garner et al. | 717/136 |

* cited by examiner

FIG. 6

```
<?xml version="1.0" encodeing="UTF-8"?>
<xs:schema xmlns:cm="http://www.ibm.com/data/cm"
        xmlns:xs="http://www.w3.org/2001/XMLSchema">
  <xs:import namespace="http://ww.ibm.com/data/cm"
        schemaLocation="cmdatamodel.xsd"/>

<xs:simpleType name="varchar_256" final="#all">
    <xs:restriction base="xs:string">
      <xs:length value="256" ="true"/>
    </xs:restriction>
  </xs:simpleType>

<xs:simpleType name="amount_type" final="#all">
    <xs:restriction base="xs:decimal">
      <xs:fractionDigits value "2" fixed="true"/>
      <xs:totalDigits value "10" fixed="true"/>
    </xs:restriction>
  </xs:simpleType>

<xs:attribute name="title" type="varchar_256"/>
  <xs:attribute name="name" type="varchar_256"/>
  <xs:attribute name="number" type="xs:integer"/>
  <xs:attribute name="cost" type="amount_type"/>
  <xs:attribute name="content" type="xs:string"/>
    <xs:annotation><xs:appinfo>
      <cm:dataType value="CLOB"/>
      <cm:textSearchable value="true"/>
      <cm:textIndexInfo commitCount="5" minChanges="5"/>
    </xs:appinfo></xs:annotation>
  </xs:attribute>
  <xs:element name="Book">
    <xs:annotation><xs:appinfo>
      <cm:itemRetention value="10" unit="year"/>
      <cm:itemTypeACL code="250"/>
      <cm:itemACL code="300"/>
    </xs:appinfo></xs:annotation>
    <xs:complexType>
      <xs:sequence>
        <xs:element name="Chapter" minOccurs="0" maxOccurs="unbounded">
          <xs:complexType>
            <xs:sequence>
              <xs:element name="Section" minOccurs="5">
                <xs:complexType>
                  <xs:attribute ref="title" use="required"/>
                  <xs:attribute ref="content" use="required"/>
                </xs:complexType>
              </xs:element>
            </xs:sequence>
            <xs:attribute ref="number" use="required"/>
            <xs:attribute ref="name" use="required"/>
          </xs:complexType>
        </xs:element>
      </xs:sequence>
      <xs:attribute ref="title" use="required"/>
      <xs:attribute ref="cost" use="required"/>
    </xs:complexType>
  </xs:element>
</xs:schema>
```

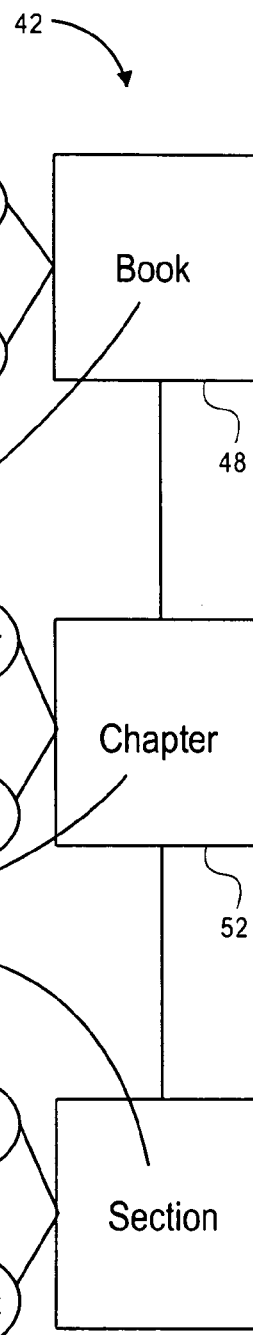

SYSTEM AND METHOD FOR DATA MODEL AND CONTENT MIGRATION IN CONTENT MANAGEMENT APPLICATIONS

FIELD

The present invention relates to the field of systems and methods for data model and content migration. More particularly, the invention relates to a system and method that utilize a markup-language user document to preserve dependency when migrating data.

BACKGROUND

The ability to manage data and associated content is becoming increasingly important due to the ever-growing utilization of computing technology in all aspects of business. Often, as content management demands increase, additional computing devices must be utilized to handle increased demand or data must be transferred between systems to compensate for varying loads. Various methods of migrating data, including data models and associated content, are known in the art to facilitate transfer of data between applications, platforms, devices, networks, systems, etc.

Unfortunately, existing methods of data migration are non-uniform and require multiple independent and unduly complex steps to complete the migration. For example, various methods require the use of multiple-proprietary formats, multiple discrete applications, and/or require a user to manually perform the migration. Such complex and time-consuming methods inhibit the ability to migrate data between systems. Further, known methods of data migration often fail to preserve dependency within data models, thereby resulting in migration data loss and formation of incomplete data definitions.

Accordingly, there is a need for improved systems and methods for data model and content migration that do not suffer from the problems and limitations of the related art.

SUMMARY

The present teachings solve the above-described problems and provide a distinct advance in the art of data migration. More particularly, the invention provides a system and method that utilize a markup-language user document to preserve dependency when migrating data. Such a configuration facilitates data migration by utilizing a readily accessible format to preserve dependency and enable compatibility among various platforms, applications, systems, devices, etc.

In one embodiment, the present invention generally provides a computer-readable medium encoded with a computer program for enabling a computer to perform a method of data migration. The method of data migration may generally comprise retrieving a plurality of objects, determining a dependency of the plurality of objects, extracting object definitions from the objects, forming a markup-language user document with the extracted object definitions utilizing the determined object dependency, and exporting the markup-language user document.

In another embodiment, the present invention generally provides a method of data migration. The method of data migration may generally comprise retrieving a plurality of objects, determining a dependency of the plurality of objects, extracting object definitions from the objects, forming a markup-language user document with the extracted object definitions utilizing the determined object dependency, and exporting the markup-language user document.

In another embodiment, the present invention provides a system for data migration. The system may be generally operable to retrieve a plurality of objects, determine a dependency of the plurality of objects, extract object definitions from the objects, form a markup-language user document with the extracted object definitions utilizing the determined object dependency, and export the markup-language user document.

It is understood that both the foregoing general description and the following description of various embodiments are exemplary and explanatory only and are not restrictive of the invention as claimed. The accompanying drawings, which are incorporated in and constitute a part of this specification, illustrate some embodiments, and together with the description serve to explain the principles of the embodiments described herein.

BRIEF DESCRIPTION OF THE DRAWINGS

The skilled artisan will understand that the drawings, described below, are for illustration purposes only. The drawings are not intended to limit the scope of the present teachings in any way.

FIG. 6 is a schematic view showing various elements operable to be utilized by the present invention in more detail.

DESCRIPTION OF VARIOUS EMBODIMENTS

Reference will now be made in detail to some embodiments, examples of which are illustrated in the accompanying drawings. Wherever possible, the same reference numbers are used throughout the drawings to refer to the same or like parts.

Figure 1:
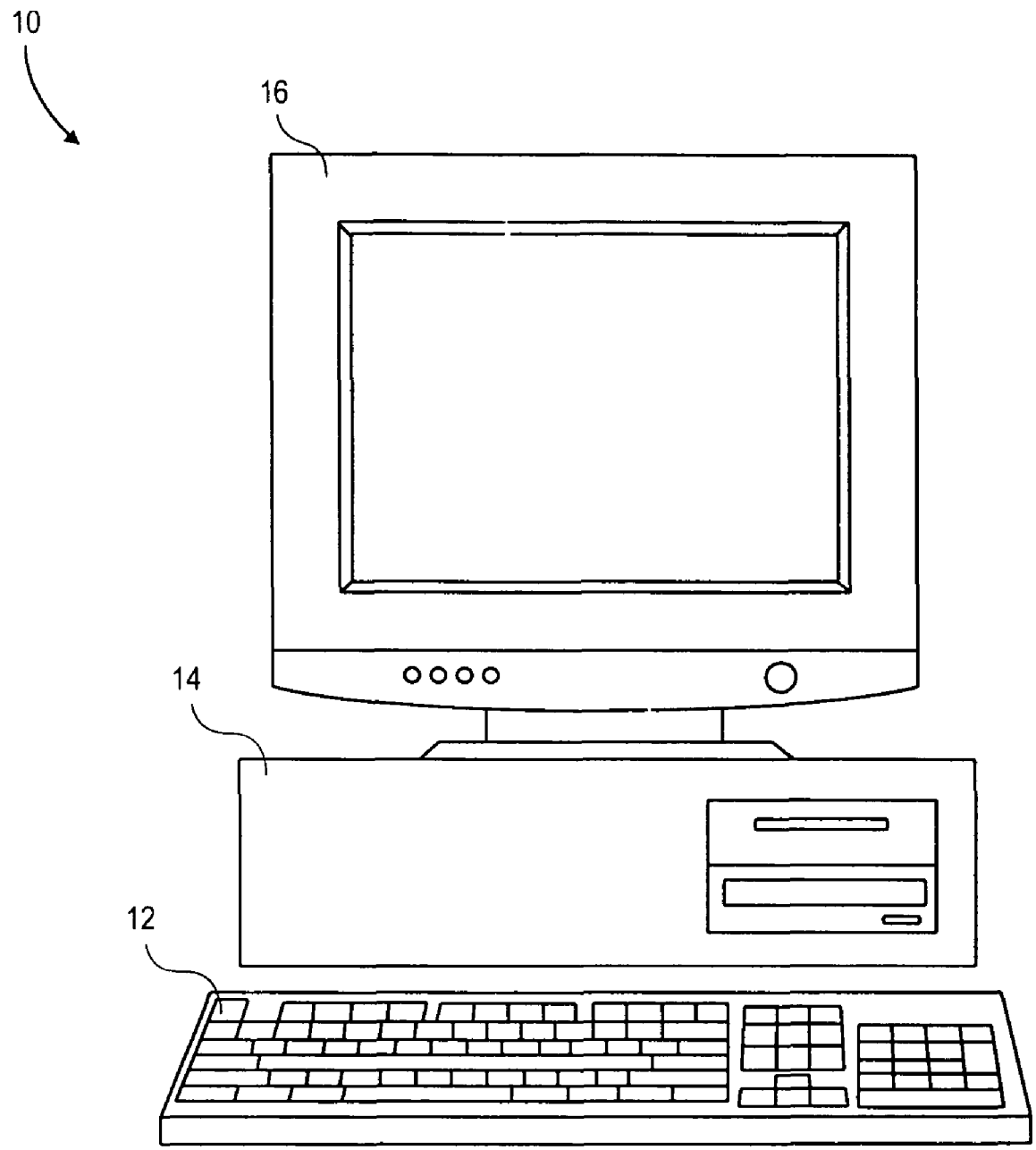
FIG. 1 is an exemplary computer for implementing a program of the present invention.

Methods consistent with the present teachings are especially well-suited for implementation on a computer or computer network, such as the computer 10 illustrated in FIG. 1 that includes a keyboard 12, a processor console 14, and a display 16. The computer 10 may be a part of a computer network, such as the computer network 18 illustrated in FIG. 2 that includes one or more client computers 20, 22 and one or more server computers 24 interconnected via a communications system 26. The present invention will thus be generally described herein as a computer program. It will be appreciated, however, that the principles of the present invention are useful independently of a particular implementation, and that one or more of the steps described herein may be implemented without the assistance of a computing device.

The present invention can be implemented in hardware, software, firmware, or a combination thereof. In a preferred embodiment, however, the invention is implemented with a computer program. The computer program and equipment described herein are merely examples of a program and equipment that may be used to implement the present invention and may be replaced with other software and computer equipment without departing from the scope of the present teachings.

Computer programs consistent with the present teachings can be stored in or on a computer-readable medium residing on or accessible by a host computer for instructing the host computer to implement the method of the present invention as described herein. The computer program preferably comprises an ordered listing of executable instructions for implementing logical functions in the host computer and other computing devices coupled with the host computer. The computer program can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

The ordered listing of executable instructions comprising the computer program of the present invention will hereinafter be referred to simply as "the program" or "the computer program." It will be understood by persons of ordinary skill in the art that the program may comprise a single list of executable instructions or two or more separate lists, and may be stored on a single computer-readable medium or multiple distinct media. In the context of this application, a "software object" is a programming unit that groups together a data structure (e.g., instance variables) and the operations (e.g., methods) that can use or affect that data.

In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electromagnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disc (CD) or a digital video disc (DVD). The computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

Figure 3:
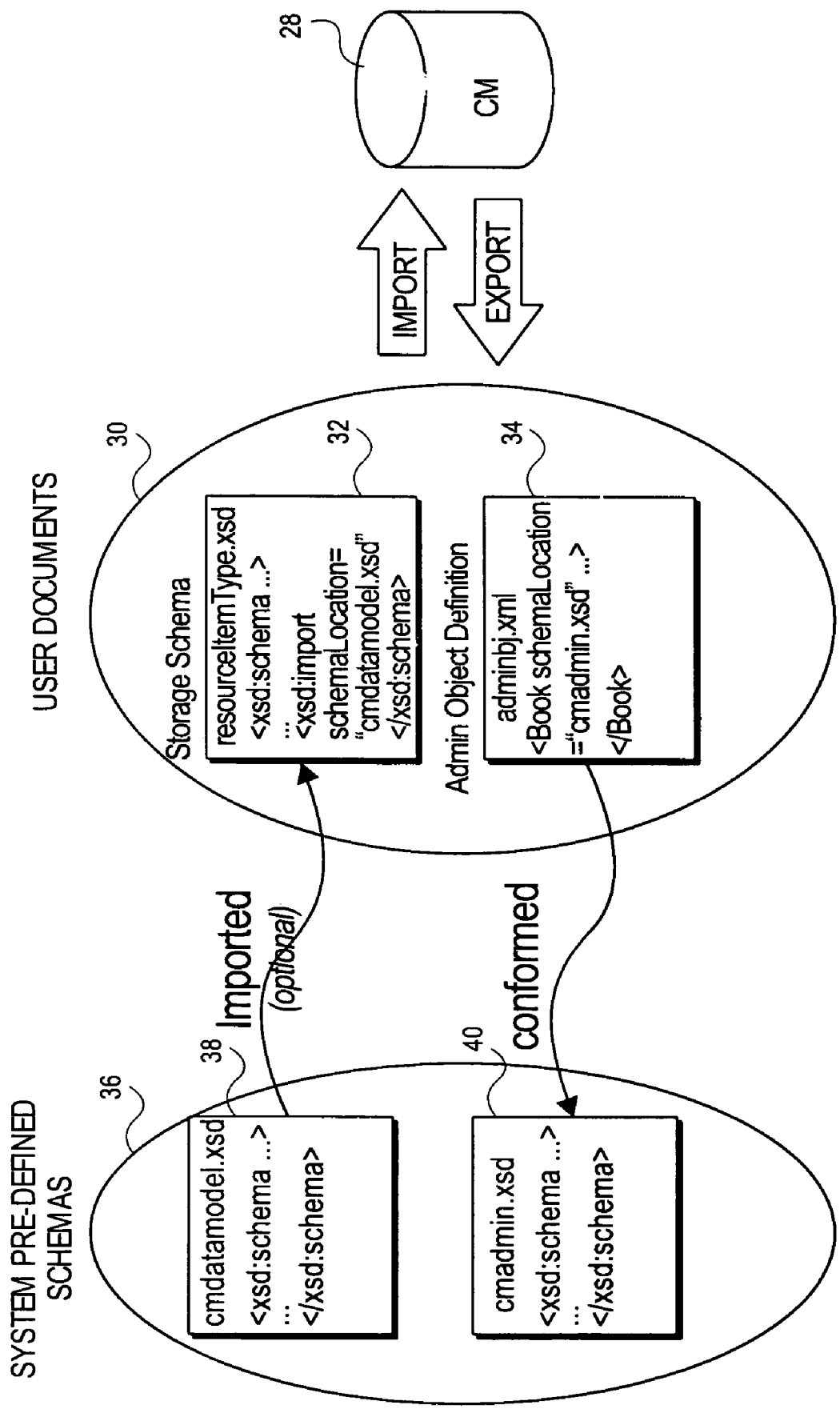
FIG. 3 is a schematic view showing various elements operable to be utilized by the present invention.

Referring to FIG. 3, various elements operable to be utilized by the present invention are illustrated. Specifically, a content management database 28 is illustrated operable to import and export one or more markup-language user documents 30. "Markup-language" as utilized herein generally refers to a computer-readable language that includes both text and additional content related to the text that facilitates processing or usage of the text. Common examples of markup-languages include the hypertext markup-language (HTML), PostScript, the extensible markup-language (XML), and the standard generalized markup-language (SGML). Various features of the present invention are preferably implemented utilizing XML, due to its wide use and powerful functionality. However, any markup-language may be utilized.

Figure 2:
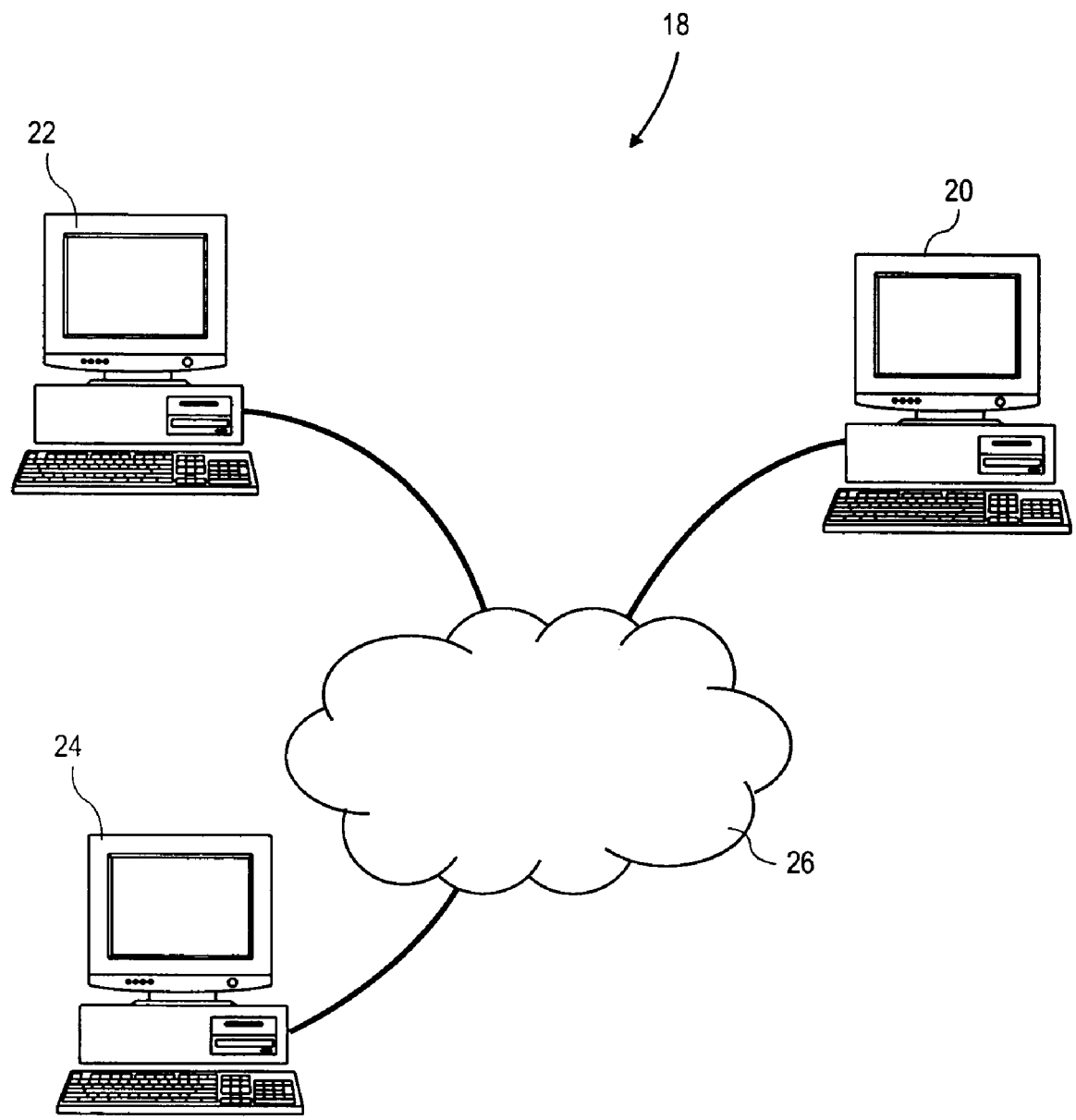
FIG. 2 is an exemplary computer network of which the computer of FIG. 1 may form a part.

Preferably, the content management database 28 comprises a relational database stored on one or more computing elements, such as the devices illustrated in FIGS. 1 and 2. For instance, the content management database 28 may be a conventional and commonly utilized relational database, such as an IBM DB2 database. However, the content management database 28 is not limited to relational databases as the content management database 28 may comprise any listing or set of stored data or information.

The user documents 30 represent data and information that are operable for migration between or within various systems. For example, the user documents 30 may be utilized to migrate data models and related content within the content management database 28 and/or between the content management database 28 and another database, content management application, device, etc. Thus, the user documents 30 are operable to be imported and exported between various devices, applications, platforms, systems, etc.

As is described below, due to the utilization of markup-language schemas and associated content, the user documents 30 may migrate between differently configured databases and/or content management applications without loss of dependency or function, such that the content management database 28 need not necessarily be compatible with other databases in order to migrate data.

The user documents 30 preferably include a storage markup-language schema 32 and a system-administration markup-language document 34. "Markup-language schema" as utilized herein generally refers to a model for defining a data structure, content, and/or semantics of markup-language documents. For instance, an XML schema may define a data structure, content, and/or semantics of an XML document. As various features of the present invention may employ XML, the storage schema 32 is preferably an XML schema and the system-administration markup-language document 34 is preferably an XML document. Specific formation of the storage schema 32 and markup-language document 34 is discussed below in more detail.

In various embodiments the present invention may additionally include system pre-defined schemas 36 to facilitate formation and use of the user documents 30. The system schemas 36 preferably include pre-defined annotations, system properties, and/or structure to facilitate formation of data models and import and export of the user documents 30. The system schemas 36 may include a markup-language data model schema 38 and a system administration object data model schema 40. In various embodiments, the system schemas 36 and user documents 30 may both correspond to XML.

The data model schema 38 may be utilized to facilitate creation, use, and application of the storage schema 32 by providing annotations to allow the representation of application specific information and/or by providing element declarations to be included within the storage schema 32. Utilization of the data model schema 38 is not necessary in all embodiments, as pre-defined elements are not required to create, import, and/or export the user documents 30.

The system administration object data model schema 40 may be utilized to define the structure of the system administration markup-language document 34. For instance, the system administration object data model schema 40 may include a definition of how to represent various system administration objects presented in the content management database 28 or conventional schema organizational elements. Utilization of the system administration object data model schema 40 is not necessary in all embodiments, as pre-defined elements are not required to create, import, and/or export the user documents 30.

As should be appreciated, the content management database 28, the user documents 30, and/or the system pre-defined schemas 36 may be included within a single computing device, such as the computer 10, across multiple computing devices, such as the network and devices illustrated in FIG. 2, within a single computer-readable medium, and/or across various computer-readable mediums.

Figure 4:
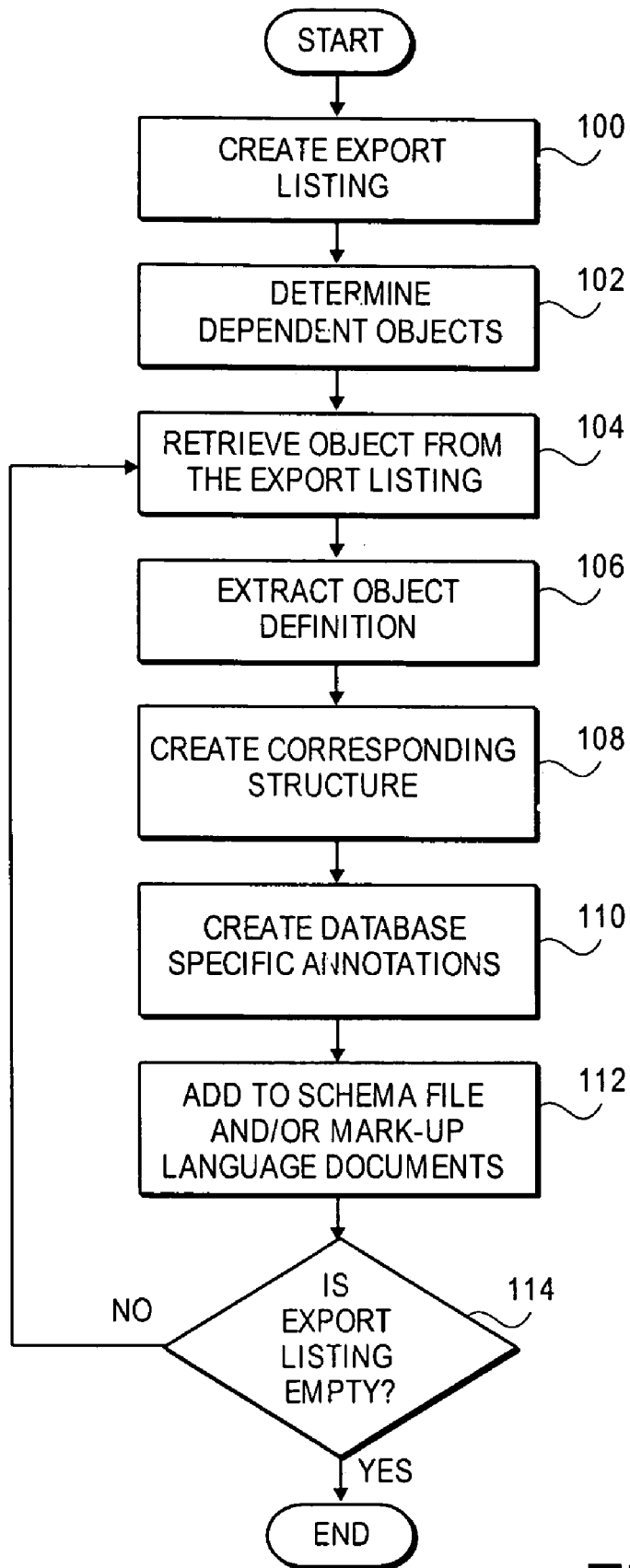
FIG. 4 is a block diagram illustrating various functions operable to be performed by the present invention to export data for migration.

A flowchart of steps that may be utilized by the present invention to export data for data migration is illustrated in FIG. 4. Some of the blocks of the flow chart may represent a module segment or portion of code of the computer program of the present invention that comprises one or more executable instructions for implementing the specified logical function or functions. In some alternative implementations, the functions noted in the various blocks may occur out of the order depicted in FIG. 4. For example, two blocks shown in succession in FIG. 4 may in fact be executed substantially concurrently, or the blocks may sometimes be executed in the reverse order depending upon the functionality involved.

Figure 5:
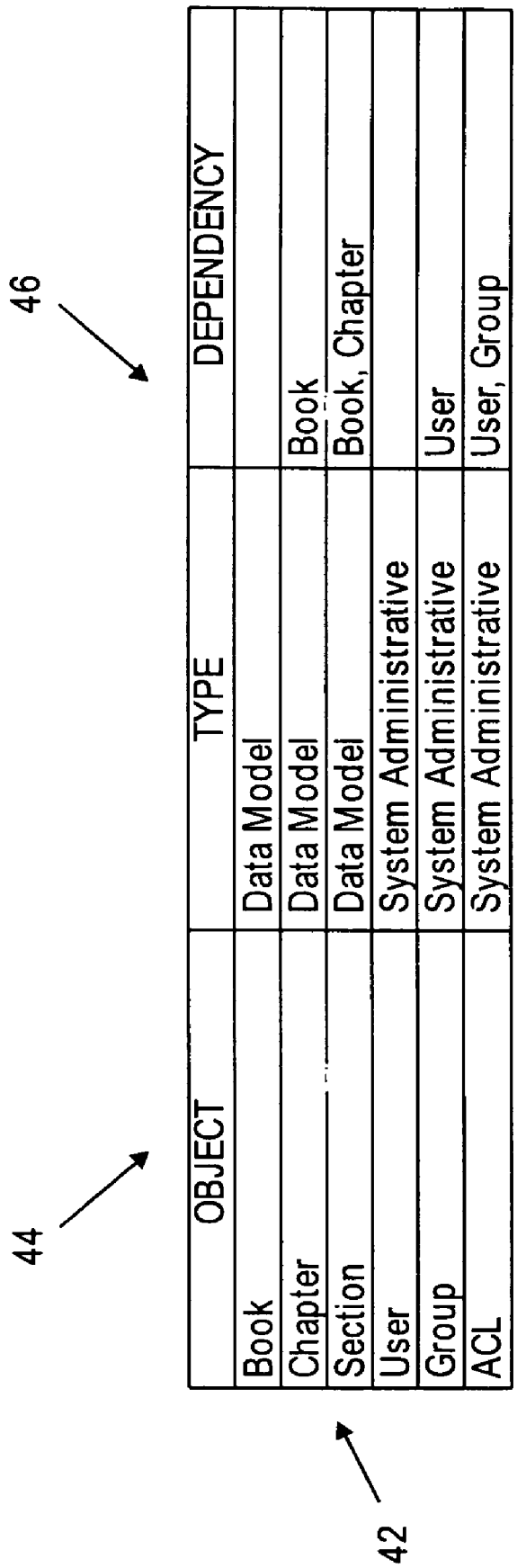
FIG. 5 is an exemplary table illustrating an export listing and/or an import listing.

Reference is now made to FIGS. 4-6. In various embodiments, the export method of FIG. 4, exemplified by steps 100-114, may utilize a plurality of objects 42 (shown in FIGS. 5-6), an export listing 44 (shown in FIG. 5), and/or a determined dependency. In step 100, the export listing 44 may be created to facilitate both determination of object dependency (step 102) and retrieval of the objects 42 (step 104). In various embodiments the export listing 44 may be configured in a table form, as shown in FIG. 5. However, the export listing 44 need not be presented in table form and may comprise any ordered listing, such as an array of data.

The objects 42 are a part of the content management database 28 and generally correspond to data and related content and may comprise data model objects and system administration objects. The system administration objects may generally include administration domains, privileges, user information, user group information, configuration, library data and information, access control, etc. The data model objects generally relate to data and associated data structures.

Preferably, the export listing 44 includes the plurality of objects 42 that are desired to be exported in addition to an indication of the dependency among the objects 42, such as the dependency determined below in step 102, to enable all required export objects to be included within the export listing 44. Such a configuration maintains dependency during the data migration process by providing data definition closure through elimination of missing dependency information.

The export listing 44 may be populated with objects as selected by a user and/or be automatically populated in response to various inputs or user-provided criteria. Further, the export listing 44 may be viewable and modifiable by a user to enable the selection of objects and associated dependent objects for export.

In various embodiments, the export listing 44 may be utilized in combination with step 102 to define the order of object export. For example, it is generally desirable to export independent objects before dependent objects to ensure that any future imported objects are imported in the proper order to preserve dependency and maintain definition closure. Thus, the objects and associated object definitions discussed below may be arranged within the export listing 44 to facilitate dependency preservation.

In step 102, the dependency of the plurality of objects 42 is determined. As is known in the art, objects such as data model and system administration objects are commonly dependent upon each other in order to form useful data hierarchies. To achieve such hierarchies, data model objects and system administration objects may be dependent upon other data model objects and/or other system administration objects.

For example, an object associated with the content management database 28 may include an item type definition that contains a default access control (ACL) value and a process name. For a given item type definition, IT1, if the property of IT1 has ACL value, a1, and a process name, p1, the ACL object describing a1 and the process definition describing p1 are the immediate dependent objects of IT1.

The dependency of the plurality of objects 42 may be determined before, concurrently with, or after creation of the export listing 44 discussed in step 100 and retrieval of the objects 42 discussed below in step 104. Additionally, the dependency may be determined by retrieving or accessing a previously determined dependency, such as in embodiments where the content management database 28 previously or continuously determines the dependency of the objects 42.

In some embodiments, the present invention may determine the dependency of the plurality of objects 42 by utilizing an algorithm. For example, the present invention may iterate through the plurality of objects 42 listed in the export listing 44 and determine object dependency accordingly. The content management database 28 may similarly and independently determine the object dependency utilizing an iteration algorithm such that the dependency may be determined by retrieving data from the content management database 28.

The algorithm may be used to determine both the dependency of the plurality of objects 42 and to create the export listing 44 of step 100. For instance, the computer 10 of FIG. 1 or the various computing elements of FIG. 2 may both determine the dependency of the plurality of objects 42 and arrange the objects 42 according to dependency within the export listing 44. Additionally, a similar algorithm may be utilized in combination with the dependency algorithm to find closure of objects presented within the export listing 44. However, the determined dependency may be utilized independent of the export listing 44 to facilitate object export.

In step 104, one or more of the plurality of objects 42 are retrieved from the content management database 28, or any other data source, for migration. The present invention does not necessarily require creation of the various objects 42 because the content management database 28, or any other data source or computing device, may be operable to create the objects 42 in a generally conventional manner. For example, various relational databases, such as IBM DB2, are operable to form, create, and/or store data model objects and system administration objects to facilitate data management and retrieval. Thus, the present invention may merely retrieve already formed objects from a computer-readable medium.

The objects 42 are preferably retrieved in the order presented in the export listing 44 to preserve object dependency. However, the objects 42 may be retrieved through manual selection by a user, such as by allowing a user to select desired objects for export. Further, the objects 42 may also be retrieved automatically without requiring manual user input or by retrieving objects 42 based on provided or ascertained criteria.

In step 106, one or more object definitions are extracted from the various retrieved objects. As is known in the art, "object definition" generally refers to the content and structure of an object. For example, the exemplary object shown in FIG. 6, discussed below in detail, relates to a book and its associated object definition would relate to the structure and organization of the book.

As described above, the objects 42 may include data model objects and system administration objects. In situations where a retrieved object corresponds to a data model object the extracted object definition corresponds to a data model definition and in situations where the retrieved object corresponds to a system administration object that object definition corresponds to a system administration object definition.

In steps 108-112, the user documents 30, including the storage schema 32 and markup-language document 34, are formed at least in part utilizing the determined dependency and the extracted object definitions. In step 108, structure corresponding to the extracted object definitions may be formed. For instance, as shown in the example of FIG. 6, the exemplary storage schema 32 is created by mapping object definitions from the exemplary object to the storage schema 32. Specifically, a root element declaration 48, "Book", is mapped to an item type 50, "Book," a child element declaration 52, such as "Chapter", is mapped to a component type 54 under the corresponding parent component type "Book", element declaration attributes 56, such as "title", "cost", "number", "name", etc, are mapped to corresponding component attributes 58, etc. A similar method may be employed to map system administration object definitions to the markup-language document 34 to create the markup-language document 34.

In step 110, various specific annotations are created to reflect database specific information. Thus, should any extracted information exist specific to the content management database 28, the present invention is operable to create annotations for inclusion within the user documents 30 to facilitate a complete data definition. For instance, if an extracted data model definition includes information specific to the content management database 28, the database specific information may be mapped to the storage schema 32 utilizing XML structure annotations.

In step 112, the storage schema 32, the markup-language documents 34, and/or any other portions of the user documents 30 may be formed from the structure and annotations. The pre-defined system schemas 36 may be utilized to facilitate creation of the user documents 30 from the extracted object definitions. For example, as described above, the pre-defined system schemas 36 may include the markup-language data model schema 38 and the system administration object data model schema 40 to enable creation of the storage schema 32 and/or the markup-language documents 34 in accord with the system schemas 36.

The retrieved system administration object definitions may be stored in the markup-language document 34 according to the structure defined in the system administration object data model schema 40. Such conformity enables consistent data migration by utilizing the system administration object data model schema 40 as a template for export. Similarly, the system data model schema 38 may be utilized to ensure consistent data migration by providing a framework and default information for creation of the storage schema 32.

As shown in step 114, steps 104-112 are preferably repeated until all elements within the export listing 44 are represented by the user documents 30, and preferably by only the storage schema 32 and the markup-language document 34. Utilization of the storage schema 32 and markup-language document 34 to export data facilitates migration of data between devices, platforms, applications, etc, due to the wide functionality provided by the two documents.

The export listing 44 may be utilized to enable creation of the storage schema 32, markup-language documents 34, and any other portion of the user documents 30 in accord with the determined dependency as the export listing 44 may be ordered such that dependent objects are listed after objects from which they depend. Thus, the user documents 30 may be formed utilizing the determined object dependency such that an object definition dependent upon an independent object definition is positioned after the independent object definition within the schema to enable export and import of the independent object definition before the dependent object definition. Such a configuration ensures dependency preservation throughout data migration.

Upon creation, the user documents 30 may be conventionally archived, stored, transmitted, copied, etc, to facilitate the exportation or migration of data represented by the objects 42 to new platforms, devices, applications, systems, etc. Thus, user documents 30, including the storage schema 32 and markup-language documents 34, may be conventionally stored in a computer-readable medium to enable later data import by a plurality of elements.

Additionally, the user documents 30 may be modified to include changes or revisions to the exported objects and object definitions. For instance, a user may be able to add a new item type, component, user definition, etc, to the user documents 30. Preferably, a definition transformer is used to modify the user documents 30 to ensure proper transformation of the storage schema 32 and markup-language document 34 and related instance data.

Figure 7:
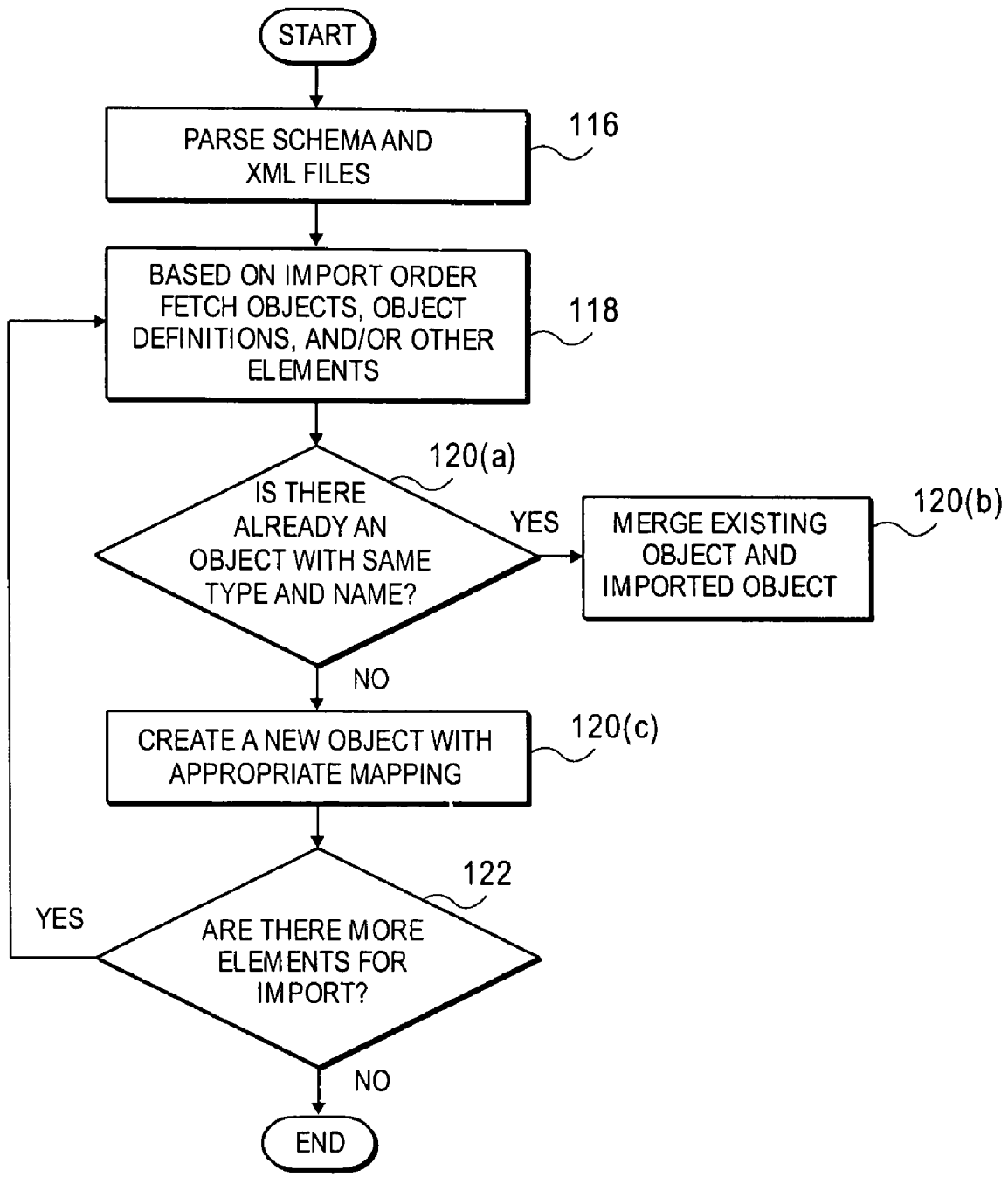
FIG. 7 is a block diagram illustrating various functions operable to be performed by the present invention to import data for migration.

A flowchart of steps that may be utilized by the present invention to import data for data migration is illustrated in FIG. 7. Some of the blocks of the flow chart may represent a module segment or portion of code of the computer program of the present invention which comprises one or more executable instructions for implementing the specified logical function or functions. In some alternative implementations, the functions noted in the various blocks may occur out of the order depicted in FIG. 7. For example, two blocks shown in succession in FIG. 7 may in fact be executed substantially concurrently, or the blocks may sometimes be executed in the reverse order depending upon the functionality involved.

In steps 116-122 of FIG. 7, data may be imported to an import system utilizing the user documents 30 by accessing the user documents 30, retrieving objects, object definitions, and/or other elements, and creating objects corresponding to the retrieved elements. After creating the objects, data corresponding to the objects may be passed to the import system utilizing markup-language documents that conform to the storage schema 32 to complete the migration of data. Thus, portions of steps 116-122 may be repeated until all elements are imported to ensure a complete migration of the data exported in steps 100-114.

In step 116, the user documents 30, and preferably the storage schema 32 and the markup-language document 34, are parsed to create an import listing 46 (see FIG. 5). The import listing 46 is created to preserve object dependency by governing the order of import in a similar manner to how the use of the export listing 44 governs object export. As described above, objects, object definitions, and other elements may be presented with the user documents 30 in accord with the export listing 44, such that dependent objects and object definitions are presented after objects and definitions from which they depend, to enable an import order, and the import listing 46, to be determined directly from the user documents 30 through parsing.

However, the import listing 46 and/or import order may be determined from other methods, such as by retrieval of the previously created export listing 44. As is shown in FIG. 5 the export listing 44 and import listing 46 may be similar. Such importation of objects utilizing the user documents 30 and the determined object dependency ensures that dependency is maintained throughout the data migration process.

In step 118, objects, object definitions, and/or other elements are retrieved from the user documents 30 based on the order defined by the import listing 46. The retrieved objects, definitions, and other elements may be conventionally stored or otherwise archived to enable migration of the data exported in steps 100-114.

In steps 120(*a*) through 120(*c*), the present invention may also include determining if an imported object conflict exists. For instance, data and content may commonly be migrated back and forth between various systems, applications, devices, platforms, etc, such that a possibility exists that an imported object is already included, in some form, within the import system. Thus, in various situations import object conflict checking may be employed to prevent the inadvertent destruction or modification of data by overwriting a previously stored object or by failing to import a new object.

The method of import object conflict checking illustrated in FIG. 7 generally includes determining if a pre-existing object exists with the same name and type as an imported object, as is referenced at step 120(*a*), and, if so, merging the existing object and the imported object, as is referenced at step 120(*b*). The objects may be merged by overwriting any properties that are common to both the existing and imported object with properties from the imported object and retaining properties within the object that are found only in the existing object. Similarly, if the imported object includes properties not found within the existing object, the unique import properties may also be included within the final stored object. If no conflict exists, a new object may be created with appropriate mapping, as is referenced at step 120(*c*).

In step 122, steps 118 through 120(*c*) are repeated until all desired objects are imported. Thus, steps 118 through 120(*c*) may be repeated until all objects, object definitions, and/or other elements included in the import listing 46 are imported. As discussed above, such functionality ensures complete data migration.

Thus, the methods for importing data utilizing the user documents 30 may be generally the opposite of methods for exporting data utilizing the user documents 30 to create corresponding data and data models in two or more systems. However, various embodiments may include alternative or additional steps to provide further desired functionality.

The section headings used herein are for organizational purposes only and are not to be construed as limiting the subject matter described in any way. All literature and similar materials cited in this application, including but not limited to, patents, patent applications, articles, books, treatises, and internet web pages, regardless of the format of such literature and similar materials, are expressly incorporated by reference in their entirety for any purpose.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

What is claimed is:

1. A physical computer-readable medium encoded with a computer program, executed on a computing system, to perform a method of data migration, the method comprising:

retrieving a plurality of data model objects and system administration objects from a first database, wherein the system administration objects include an access control list value;

determining a dependency of the plurality of data model objects and system administration objects;

providing data definition closure to the determined dependency through the elimination of missing dependency information;

extracting data model object definitions from the plurality of data model objects;

extracting system administration object definitions from the plurality of system administration objects;

extracting object annotations from the plurality of data model objects wherein the extracted object annotations contain information specific to the database;

forming a markup-language user document with the extracted object annotations, the extracted data model object definitions and the extracted system administration object definitions utilizing the determined dependency;

exporting the formed markup-language user document to a computer-readable medium connected to the computing system;

importing the formed markup-language user document from the computer-readable medium connected to the computing system;

retrieving the extracted data model object definitions, the extracted object annotations and the extracted system administration object definitions from the formed markup-language user document according to the determined dependency such that an extracted data model object definition dependent upon an extracted independent data model object definition or an extracted independent system administration object definition is retrieved after the extracted independent data model object definition or the extracted independent system administration object definition to form imported objects; and performing a conflict check on the formed imported objects;

merging the formed imported objects with corresponding existing objects in a second database if a conflict exists; and at the second database, creating new objects corresponding to the retrieved extracted data model object definitions, the extracted system administration object definitions and the extracted object annotations, if no conflict exists.

2. The physical computer-readable medium of claim 1, wherein a plurality of markup-language user documents is formed including a storage schema and a markup-language document.

3. The physical computer-readable medium of claim 1, wherein the markup-language corresponds to extensible markup-language.

4. The physical computer-readable medium of claim 1, wherein the data model objects and the system administration objects are retrieved utilizing an export table listing.

5. The physical computer-readable medium of claim 1, wherein the formed markup-language user document is formed utilizing the determined object dependency such that an object definition dependent upon an independent object definition is positioned after the independent object definition within the formed markup-language user document to facilitate export of the independent object definition before the dependent object definition.

6. A method of data migration, the method comprising:

retrieving a plurality of data model objects and system administration objects from a computing system having a first database wherein the system administration objects include an access control list value;

determining a dependency of the plurality of data model objects and system administration objects;

providing data definition closure to the determined dependency through the elimination of missing dependency information;

extracting data model object definitions from the plurality of data model objects;

extracting system administration object definitions from the plurality of system administration objects;

extracting object annotations from the plurality of data model objects wherein the extracted object annotations contain information specific to the database;

forming a markup-language user document with the extracted object annotations, the extracted data model object definitions and the extracted system administration object definitions utilizing the determined dependency;

exporting the formed markup-language user document to a computer-readable medium connected to the computing system;

importing the formed markup-language user document from the computer-readable medium connected to the computing system;

retrieving the extracted data model object definitions, the extracted object annotations and the extracted system administration object definitions from the formed markup-language user document according to the determined dependency such that an extracted data model object definition dependent upon an extracted independent data model object definition or an extracted independent system administration object definition is retrieved after the extracted independent data model object definition or the extracted independent system administration object definition to form imported objects; and performing a conflict check on the formed imported objects;

merging the formed imported objects with corresponding existing objects in a second database if a conflict exists; and at the second database, creating new objects corresponding to the retrieved extracted data model object definitions, the extracted system administration object definitions and the extracted object annotations, if no conflict exists.

7. The method of claim 6, wherein a plurality of markup-language user documents is formed including a storage schema and a markup-language document.

8. The method of claim 6, wherein the markup-language corresponds to extensible markup-language.

9. The method of claim 6, wherein the data model objects and the system administration objects are retrieved utilizing an export table listing.

10. The method of claim 6, wherein the formed markup-language user document is formed utilizing the determined object dependency such that an object definition dependent upon an independent object definition is positioned after the independent object definition within the formed markup-language user document to facilitate export of the independent object definition before the dependent object definition.

11. A computing system for data migration, the computing system comprising: a processor and a memory embedded with computer instructions, wherein the computer instructions are executed by the processor to perform the following steps:

retrieve a plurality of data model objects and system administration objects from a first database wherein the system administration objects include an access control list value;

determine a dependency of the plurality of data model objects and system administration objects;

provide data definition closure to the determined dependency through the elimination of missing dependency information;

extract data model object definitions from the plurality of data model objects;

extract system administration object definitions from the plurality of system administration objects;

extract object annotations from the plurality of data model objects wherein the extracted object annotations contain information specific to the database;

form a markup-language user document with the extracted object annotations, the extracted data model object definitions and the extracted system administration object definitions utilizing the determined dependency;

export the formed markup-language user document to a computer-readable medium connected to the computing system;

import the formed markup-language user document from the computer-readable medium connected to the computing system;

retrieve the extracted data model object definitions, the extracted object annotations and the extracted system administration object definitions from the formed markup-language user document according to the determined dependency such that an extracted data model object definition dependent upon an extracted independent data model object definition or an extracted independent system administration object definition is retrieved after the extracted independent data model object definition or the extracted independent system administration object definition to form imported objects; and perform a conflict check on the formed imported objects;

merge the formed imported objects with corresponding existing objects in a second database if a conflict exists; and at the second database, create new objects corresponding to the retrieved extracted data model object definitions, the extracted system administration object definitions and the extracted object annotations, if no conflict exists.

12. The computing system of claim 11, wherein a plurality of markup-language user documents is formed including a storage schema and a markup-language document.

13. The computing system of claim 11, wherein the markup-language corresponds to extensible markup-language.

14. The computing system of claim 11, wherein the data model objects and the system administration objects are retrieved utilizing an export table listing.

15. The computing system of claim 11, wherein the formed markup-language user document is formed utilizing the determined object dependency such that an object definition dependent upon an independent object definition is positioned after the independent object definition within the formed markup-language user document to facilitate export of the independent object definition before the dependent object definition.

* * * * *